United States Patent [19]

Miyano

[11] Patent Number: 4,847,803
[45] Date of Patent: Jul. 11, 1989

[54] PORTABLE ELECTRONIC DEVICE WITH MEANS FOR DETERMINING WHETHER AN EXTERNALLY SUPPLIED INSTRUCTION IS EXECUTABLE

[75] Inventor: Toshihiro Miyano, Yokohama, Japan
[73] Assignee: Kabushiki Kaisha Toshiba, Kawasaki, Japan
[21] Appl. No.: 154,035
[22] Filed: Feb. 9, 1988

[30] Foreign Application Priority Data

Feb. 17, 1987 [JP] Japan .................................. 62-34136

[51] Int. Cl.$^4$ .......................... G06F 3/023; H04L 9/00
[52] U.S. Cl. ..................................... 364/900; 380/23; 235/382; 340/825.34
[58] Field of Search ................................... 380/23, 24; 235/379–382.5; 340/505, 825.3, 825.31, 825.33, 825.34; 364/200, 300, 900

[56] References Cited

U.S. PATENT DOCUMENTS 4,460,960  7/1984  Anderson et al. ................ 380/24 X
4,757,533  7/1988  Allen et al. ........................... 380/25

*Primary Examiner*—David L. Clark
*Attorney, Agent, or Firm*—Cushman, Darby & Cushman

[57] ABSTRACT

A portable electronic device, such as an IC card has a control element, a data memory, and a program memory. The program memory stores various function programs, and the data memory stores the head addresses of the function programs and the control data items for controlling them, along with instruction data items which can be used in the IC card. The data memory additionally stores a plurality of personal identification number (PIN) items. Each of the control data items is related to one of the PIN items, and contains identifiers which indicate whether or not a PIN item input via an external device should be compared with any PIN items. The control element has a RAM which is used to store the results of comparisons between each the externally input PIN item and PIN items. When a usable instruction data item is input via the external device, the control element determines whether or not this instruction data item can be processed, in accordance with the data items stored in the RAM in accordance with the identifiers related to the instruction data items stored in the data memory. When it has determined that the instruction data item can be processed, the control element then processes the instruction data item.

3 Claims, 5 Drawing Sheets

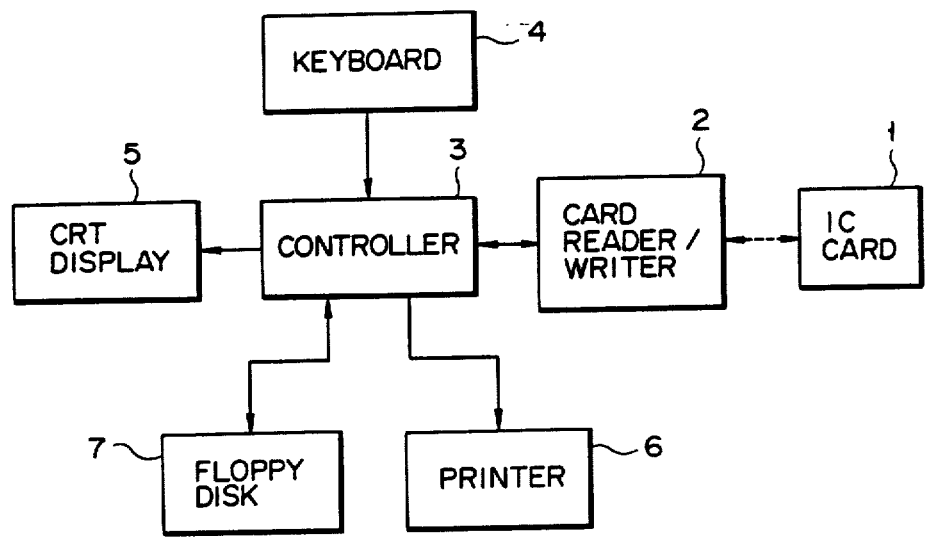
F I G. 1
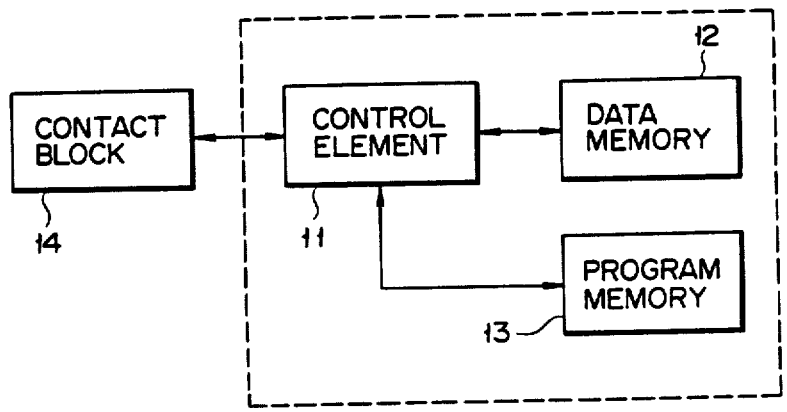
F I G. 2

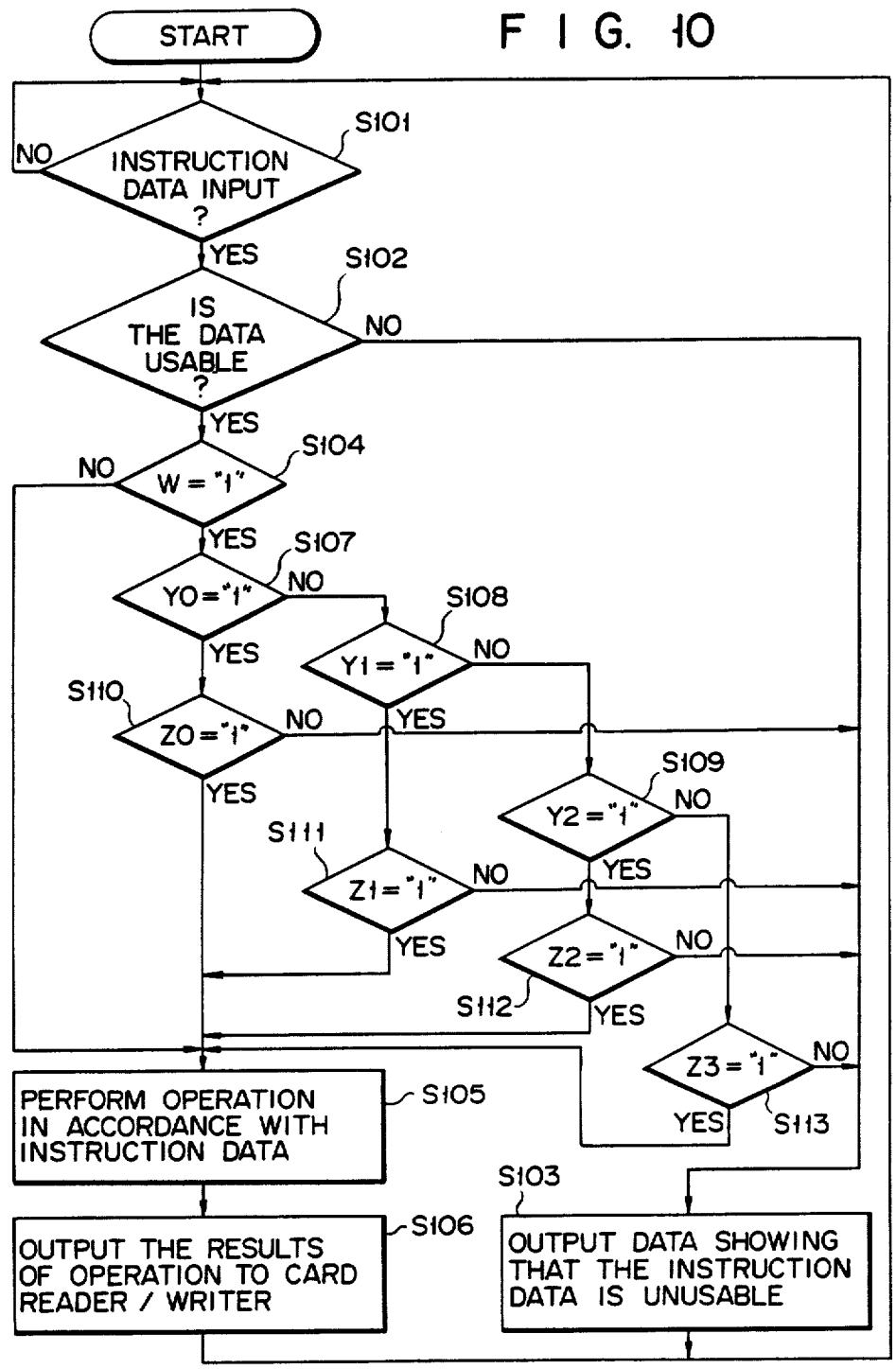

PORTABLE ELECTRONIC DEVICE WITH MEANS FOR DETERMINING WHETHER AN EXTERNALLY SUPPLIED INSTRUCTION IS EXECUTABLE

BACKGROUND OF THE INVENTION

1. Field of the Invention

The present invention relates to a portable electronic device, generally known as an "IC card," which contains an integrated circuit (IC) chip having, for example, a non-volatile data memory and a control element such as a CPU.

2. Description of the related art including information disclosed under §1.97–1.99.

IC cards, for use as portable data-storing electronic devices, have been developed quite recently. Each IC card contains an IC chip which has a non-volatile data memory and a control element such as a CPU. The control element accesses the data memory in accordance with instruction data input thereinto from an external device, so that relevant data can be written into or read out from the data memory. The data memory itself is divided into a plurality of data areas, any one of which can be accessed, as required, by the control element.

In conventional IC cards, as can be understood from U.S. patent application Ser. No. 696,099 to Tamada et al., entitled "Portable Data Storing/Processing Device," some of the data areas of the data memory are, so to speak, "locked". These locked data areas cannot be accessed unless the personal identification numbers (PINs) which are assigned to them are first input. Examples of such PINs are the card manufacture's PIN, the card issuer's PIN, the card holder's PIN, and the like. Various items of instruction data are commonly available for the card manufacture, issuer, holder, etc. When a desired data area is locked which can be used by the card issuer only, the card issuer's PIN is input to the IC card, and then an instruction data item is input thereto, whereby the data stored in the desired data area is processed in accordance with the instruction data.

When, in the above circumstances, the instruction data is input to the IC card without the card issuer's PIN being input, the control element outputs, to an external device, response data indicating that the instruction designated by the instruction data cannot be executed, and accordingly does not process the data stored in the relevant data area. When invalid instruction data, i.e. data which cannot be processed in the IC card, is input to the IC card, the control element outputs response data indicating that such input instruction data has not been defined. Since, therefore, it is possible for anyone to determine what is valid and invalid instruction data, simply by inputting every possible instruction data item to the IC card and checking the response in each case, the conventional IC card cannot thus be considered as providing a sufficient degree of data security.

SUMMARY OF THE INVENTION

Accordingly, it is an object of the present invention to solve the problem inherent in conventional portable electronic devices, i.e., the possibility that anyone can, through trial-and-error, ascertain the instruction data items which enable ALL data areas of these devices to be accessed. In other words, the object of the invention is to provide an portable electronic device which ensures a sufficient degree of data security.

According to the present invention, there is provided a portable electronic device having a data memory means and a control means for reading data out of the data memory means to an external device, and for writing data from the external device into the data memory means. This portable electronic device additionally comprises:

PIN memory means for storing a plurality of personal identification number (PIN) items;

comparing means for comparing a PIN input via the external device with each of the PIN items stored in the PIN memory means;

comparison result memory means for storing item of data indicating whether or not the PIN input via the external device is identical to the PIN item;

control data memory means for storing items of control data which correspond to instruction data items input via the external device, respectively, and which represent PIN comparison necessity by said comparing means; and judging means for determining whether or not the control means can process the input instruction data item, in accordance with the control data item corresponding to the instruction data item, and also with the data item stored in the comparison result memory means.

BRIEF DESCRIPTION OF THE DRAWINGS

FIG. 1 is a schematic block diagram showing an IC card terminal used in combination with the IC card, (i.e., the portable electronic device) according to one embodiment of the present invention;

FIG. 2 is a block diagram schematically illustrating the IC card according to the invention;

FIG. 10 is a flow chart explaining how an instruction data item is processed.

DETAILED DESCRIPTION OF THE PREFERRED EMBODIMENT

Figure 3:
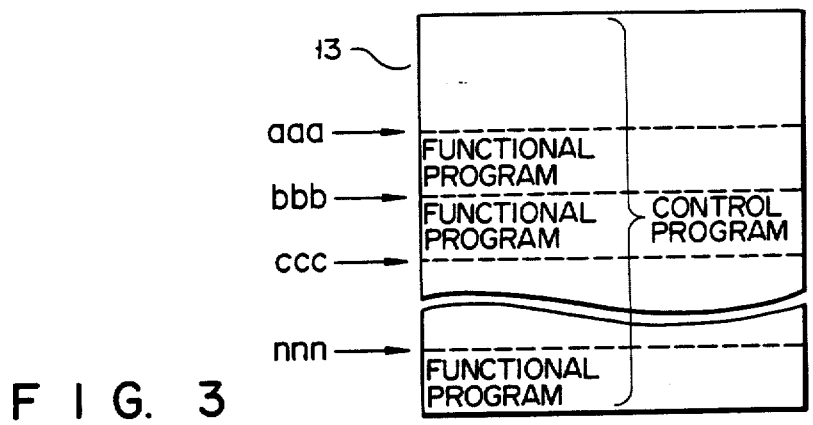
FIG. 3 is a schematic diagram showing the structure of the program memory used in the IC card of FIG. 2.

An embodiment of the present invention will now be described, with reference to the accompanying drawings.

FIG. 1 shows schematically an IC card terminal designed for use in combination with IC card 1 according to an embodiment of the present invention. The IC card terminal comprises card reader/writer 2, controller 3, keyboard 4, CRT display 5, printer 6, and floppy disk drive 7. Card reader/writer 2 is connected to controller 3 which comprises a CPU. IC card 1, when inserted in card reader/writer 2, is connected to controller 3, which is itself coupled to keyboard 4, CRT display 5, printer 6 and floppy disk drive 7.

FIG. 2 schematically illustrates IC card 1. As is shown in this figure, IC card 1 comprises control element 11 (e.g., a CPU), data memory 12, program memory 13, and contact section 14. Data memory 12 is a non-volatile memory, and thus, data stored therein can be erased. Contact section 14 electrically connects control element 11 to card reader/writer 2 when IC card 1 is inserted into the IC card terminal shown in FIG. 1. Those components of IC card 1 which are shown within the rectangle (made up of broken lines) i.e. control element 11, data memory 12, and program memory 13, are all formed within a single IC chip which is embedded in the body of IC card 1.

Program memory 13 can be, for instance, a mask ROM. As is shown in FIG. 3, program memory 13 stores a control program for controlling control element 11. This control program includes various function programs assigned to a plurality of instruction data items.

Figure 4:
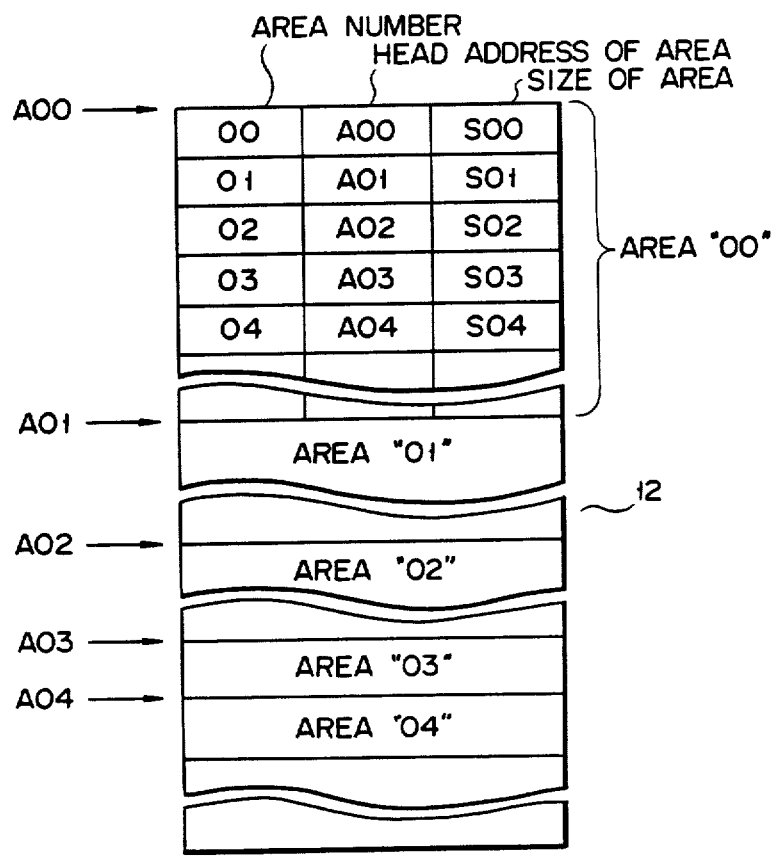
FIG. 4 is a diagram schematically illustrating the structure of the data memory used in the IC card of FIG. 2.

Data memory 12 is used to store various types of data, and can be, for example, an EEPROM. As is shown in FIG. 4, this memory is divided into a plurality of areas, each of which is assigned an area number, "00", "01", "02", and so forth.

Figure 5:
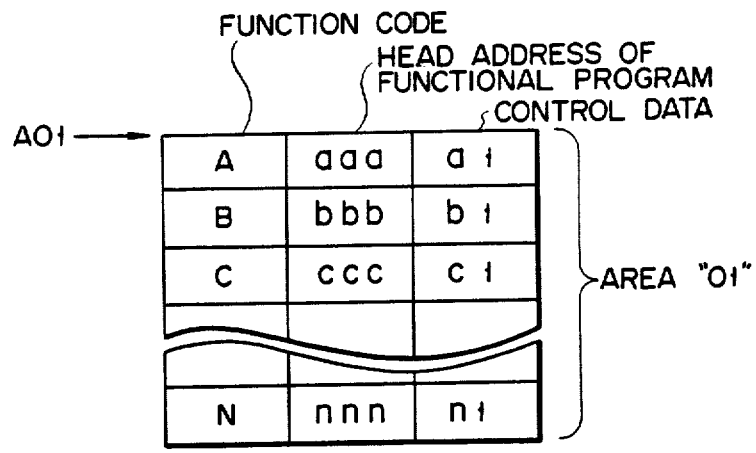
FIG. 5 shows a memory map of the data memory, explaining how control data items and the head addresses of function programs are stored in the data memory, with respect to various function codes.
Figure 6:
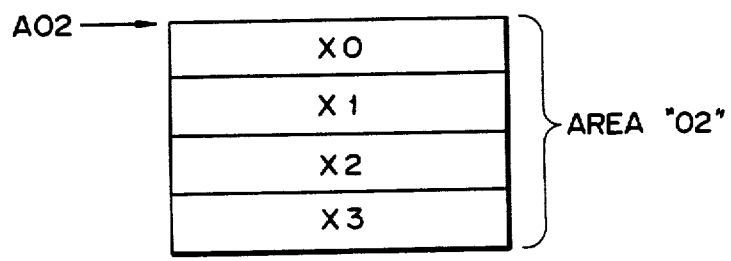
FIG. 6 is a schematic diagram showing the PIN items stored in the data memory.

Area "00" of data memory 12 is used to store the head addresses of all the areas, their sizes (each of the size data indicating the number of bytes forming a given area), as well as their numbers. For example, in the case area "03", area "00" stores head address "A03" and area size "S03". As is shown in FIG. 5, area "01" stores the head addresses and control data items of the function programs stored in program memory 13, together with function codes. For instance, head address "bbb" for the program related to function code "B", control data item "bl" for the same program are stored, along with function code "B". Further, as is illustrated in FIG. 6, area "02" stores a plurality of personal identification number (PIN) items, "X0" to "X3", which will be compared against any PIN item input to IC card and which represent the card manufacture's PIN, the card issuer's PIN, the card holder's PIN, and so forth. Area "03" and the areas which follow are used to store data which is to be processed.

Figure 7:
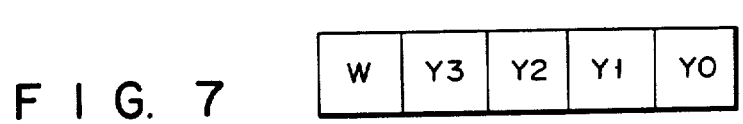
FIG. 7 is a diagram showing a control data item.

FIG. 7 shows schematically the control data item stored in area "01" and related to a function code. This information item is composed of identifiers "Y0" to "Y3", and "W". Identifiers "Y0" to "Y3" are related to PIN items "X0" to "X3", respectively, and indicate whether or not the corresponding PIN items should be compared against any PIN item input to IC card 1. More specifically, when any one of these identifiers is "1", the corresponding stored PIN item must then be compared against the externally input PIN item, while when it is "0", no comparison need be carried out. For instance, when identifier "Y0" is "1", PIN item "X0" must then be compared against any PIN item input to IC card 1. Identifier "W" indicates whether or not the other identifiers, i.e., "Y0" to "Y3", should be checked. When identifier "W" is "1", identifiers "Y0" to "Y3" then have to be checked. When, on the other hand, identifier "W" is "0", identifiers "Y0" to "Y3" do not have to be checked.

Figure 8:
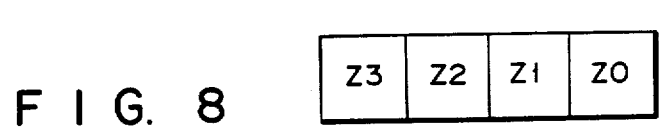
FIG. 8 is a diagram showing the data stored in the RAM provided within the control element shown in FIG. 2, this data constituting the results of a comparison of a PIN item stored in the data memory with a PIN item input to the IC card.

FIG. 8 schematically illustrates the data constituting the results of comparisons of each PIN item stored in data memory 12 against a PIN item input to IC card 1. As is shown in FIG. 8, this data is composed of identifiers "Z0" to "Z3" which correspond to PIN items "X0" to "X3", respectively, and each of which indicates whether or not the corresponding PIN item is identical to any PIN item input to IC card 1. More precisely, when it is "1", this signifies that the stored PIN item is identical to the externally input PIN item, while when it is "0", this signifies that the stored PIN item is not identical to the externally input PIN item. For example, when identifier "Z0" is "1", this signifies that PIN item "X0" has been found to be identical to the PIN item input to IC card 1. Identifiers "Z0" to "Z3", which indicate the results of the comparison between a PIN item stored in data memory 12 and a PIN item input to IC card 1, are stored in a specified area of the RAM (not shown) provided within control element 11.

Figure 9:
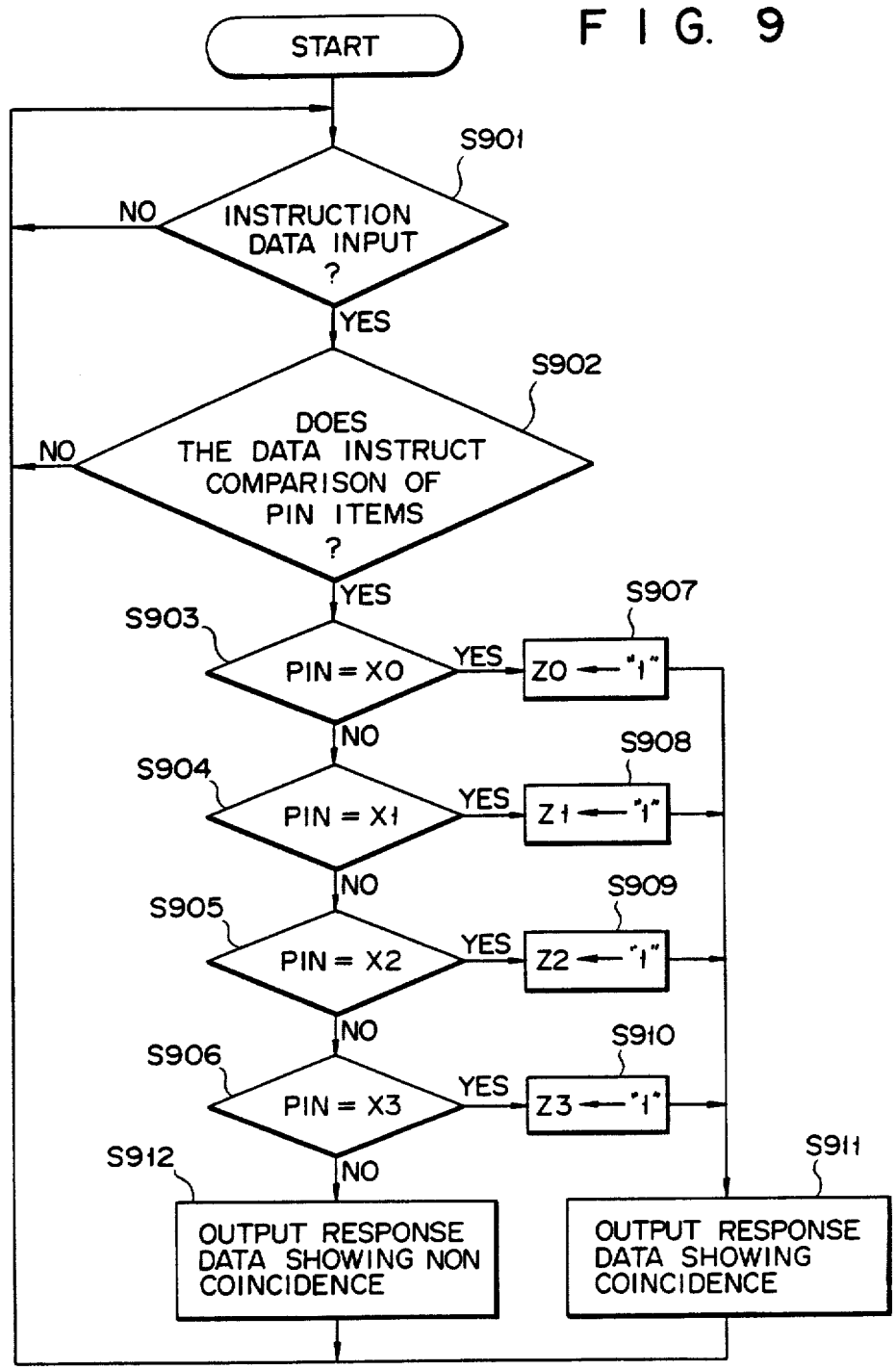
FIG. 9 is a flow chart explaining how each PIN item input to the IC card is checked.

The way in which the IC card described above operates will now be explained. First, the way in which a PIN item is compared against any PIN item input to IC card 1 will be described, with reference to the flow chart of FIG. 9.

First, it is determined, in step S901, whether or not instruction data has been input from card reader/writer 2 to IC card 1 inserted in the IC card terminal. If YES, control element 11 determines in the next step, S902, whether or not this instruction data is instructing a comparison of PIN items. If YES, the operation goes to step S903, in which it is determined whether or not the PIN item contained in the instruction data is identical to PIN item "X0" stored in area "02" of data memory 12. If NO, the operation goes to step 904, in which it is determined whether or not the PIN item is identical to PIN item "X1", also stored in area "02". If NO in step S904, it is determined, in step S905, whether or not the PIN item is identical to PIN item "X2" stored in area "02". If NO in step S905, it is then determined, in step S906, whether or not the PIN item is identical to PIN item "X3" stored in area "02". If NO in step S901, step S901 is repeated. If NO in step S902, the operation returns to step S901.

If YES in step S903, control element 11 sets identifier "Z0" stored in the RAM to the value of "1", in step S907. If YES in step S904, control element 11 sets identifier "Z1" to "1", in step S908. If YES in step S905, element 11 sets identifier "Z2" to "1". If YES in step S906, control element 11 sets identifier "Z3" to "1", in step S910. When step 907, 908, 909, or 910 is performed, control element 11 outputs, step S911, response data to card reader/writer 2, indicating that the input PIN item has been found to be identical to one of the PIN items stored in area "02" of data memory 12. Then, the operation returns to step S901.

If NO in step S906, that is, if the input PIN item is found to be identical to none of the PIN items stored in data memory 12, i.e., "X0", "X1", "X2" and "X3", control element 11 outputs, in step S912, response data, to that effect, to card reader/writer 2. When this is the case, the operation then returns to step S901.

It will now be explained, with reference to the flow chart of FIG. 10, how IC card 1 operates in response to instruction data other than data instructing comparison of PIN items.

First, it is determined, in step S101, whether or not instruction data has been input to IC card 1 from card reader/writer 2. If NO, step S101 is repeated, while if YES, control element 11 determines, in step S102, whether or not the instruction data is valid for use in IC card 1. If NO, control element 11 outputs, in step S103, response data to card reader/writer 2, indicating that the input instruction data is not valid. When this is the case, the operation returns to step S101.

If YES in step S102, the operation goes to step S104. In step S104, control element 11 searches area "01" of data memory 12 for the function code contained in the instruction data, and then determines whether or not identifier "W" related to the function code is set to "1". If NO, none of identifiers "Y0" to "Y3" need be checked. Therefore, control element 11 performs, in step S105, the operation specified in the function program, stored in program memory 13, which corresponds to the instruction data. More specifically, control element 11 identifies the head address of the function program corresponding to the function code found in area "01" of data memory 12, and then performs the operation specified in this function program. Then, in step S106, control element 11 outputs, to card reader/writer 2, response data indicating the results of the operation it has performed. Thereafter, the operation returns to step S101.

If YES in step S104, that is, if identifier "W" is set to "1", control element 11 determines, in step S107, whether or not identifier "Y0" is "1". If NO, it is determined, in step S108, whether or not identifier "Y1" is "1". If NO in step S108, it is determined, in step S109, whether or not identifier "Y2" is "1". If YES in step S107, control element 11 determines, in step S110, whether or not identifier "Z0" related to identifier "Y0" is "1". If YES in step S110, control element 11 performs, in step S105, the operation specified in the function program corresponding to the instruction data. In the next step, S106, control element 11 outputs, to card reader/writer 2, response data indicating the results of the operation it has performed. Then, the operation returns to step S101.

If NO in step S110, that is, if identifier "Z0" is not "1", this signifies that no PIN items have been compared, or that no PIN item input to IC card 1 has been found to be identical to any of the PIN items stored in memory data 12. When this is the case, control element 11 does not perform any operations, and outputs, in step S103, response data to card reader/writer 2, indicating that the input instruction data is not valid for use in IC card 1. Hence, the operation returns to step S101.

If YES in step S108, control element 11 determines, in step S111, whether or not identifier "Z1" related to identifier "Y1" is "1". If YES in step S111, control element 11 performs, in step S105, the operation specified in the function program corresponding to the instruction data. If NO in step S111, that is, if identifier "Z1" is not "1", control element 11 does not perform any operations, and outputs, in step S103, response data to card reader/writer 2, indicating that the input instruction data is not valid for use in IC card 1. Hence, the operation returns to step S101.

If YES in step S109, control element 11 determines, in step S112, whether or not identifier "Z2" related to identifier "Y2" is "1". If YES in step S112, control element 11 performs, in step S105, the operation specified in the function program corresponding to the instruction data. If NO in step S112, that is, if identifier "Z2" is not "1", control element 11 does not perform any operations, and outputs, in step S103, response data to card reader/writer 2, indicating that the input instruction data is not valid for use in IC card 1. Hence, the operation returns to step S101.

If NO in step S109, control element 11 determines, in step S113, whether or not identifier "Z3" related to identifier "Y3" is "1". If YES in step S113, control element 11 performs, in step S105, the operation specified in the function program corresponding to the instruction data. If NO in step S113, that is, if identifier "Z3" is not "1", control element 11 does not perform any operations, and outputs, in step S103, response data to card reader/writer 2, indicating that the input instruction data is not valid for use in IC card 1. Hence, the operation returns to step S101.

As has been described above, according to the present invention, when a usable instruction data item is input to IC card 1, it is determined whether or not it is necessary to compare an externally input PIN item against the PIN items stored in data memory 12, such as the card manufacture's PIN, the card issuer's PIN, the card holder's PIN, and so forth. Therefore, the usable instruction data items can be locked. An operation can be performed in accordance with any locked instruction data item only when the PIN item related to this instruction data item is identical to the externally input PIN item. When an instruction data item is input, which is not valid for use in IC card 1, or when none of the stored PIN items is identical to the externally input PIN item, response data is output from the IC card, indicating that the input instruction data cannot be identified. As a result of this measure, those instruction data items which are valid for use cannot be learned from the response data. In short, even if an instruction data item input to the IC card is found to be valid for use therein, an operation specified by such an instruction cannot be performed unless the instruction data item is accompanied by an externally input PIN item which is identical to one of the PIN items stored in the IC card, such as the manufacture's PIN, the card issuer's PIN, or the card holder's PIN. Thus, the IC card of this invention can be said to provide a sufficient degree of data security.

Although the embodiment described above relates specifically to an IC card, the portable electronic device of this invention is not limited to a card-shaped one, but can be in the form of a block or a pencil. Further, the hardware of the portable electronic device can be changed or modified without departing from the scope of the present invention.

What is claimed is:

1. A portable electronic device having data memory means and control means for reading data from the data memory means to an external device, and writing data into the data memory means from the external device, said portable electronic device comprising:

PIN memory means for storing a plurality of personal identification numbers (PINs);

comparing means for comparing a PIN input via the external device with each of the PINs stored in said PIN memory means;

comparison result memory means for storing, in one-to-one correspondence with the stored PINs, each of the comparison results between the externally supplied PIN and the PINs stored in said PIN memory means;

control data memory means for storing control data which correspond to instruction data input via the external device, and which indicate which instruction data require examination of the comparison between said PIN input and said stored PINs performed by said comparing means;

determining means for determining the necessity for a PIN comparison by reading the control data to the input instruction; and means for commanding said control means to execute the input instruction if the comparison result stored in said comparison result memory means, indicating a coincidence between the input PIN and one of the stored PINs, corresponds to information in the control data which indicates user input PINs for which the input instruction can be executed.

2. The portable electronic device according to claim 1, wherein said judging means further determines whether or not an instruction data item input via the external device is a usable one, and when it determines that the instruction data item is unusable, causes said control means not to process the instruction data item and then outputs response data to the external device, said response data indicating that the instruction data item is unusable.

3. The portable electronic device according to claim 1, wherein said judging means causes said control means not to process the instruction data item when it determines that said control means is unable to process the instruction data item, and then outputs response data to the external device, said response data indicating that the instruction data item is unusable.

* * * * *